United States Patent [19]

Liu

[11] Patent Number: 4,468,086

[45] Date of Patent: Aug. 28, 1984

[54] TRAVELING WAVE, VELOCITY MISMATCHED GATE

[75] Inventor: Pao-Lo P. Liu, Morganville, N.J.

[73] Assignee: AT&T Bell Laboratories, Murray Hill, N.J.

[21] Appl. No.: 318,353

[22] Filed: Nov. 5, 1981

[51] Int. Cl.³ .......................................... G02B 5/174
[52] U.S. Cl. ................................................ 350/96.14
[58] Field of Search ............... 333/109, 113, 115, 116; 350/96.12, 96.13, 96.14

[56] References Cited

U.S. PATENT DOCUMENTS

| | | | |
|---|---|---|---|
| 4,005,927 | 2/1977 | Caton | 350/96.14 |
| 4,251,130 | 2/1981 | Marcatili | 350/96.14 |
| 4,372,643 | 2/1983 | Liu et al. | 350/96.14 |
| 4,380,364 | 4/1983 | Marcatili | 350/96.14 |

OTHER PUBLICATIONS

White et al., *Proceedings of the IEEE*, vol. 61, Jan. 1963, "Electro-Optical Modulators Employing Intermittent Interaction", p. 214.

Kogelnik et al., *IEEE J. of Quantum Electronics*, vol. QE-12, No. 7, Jul. 1976, "Switched Directional Couplers with Alternating $\Delta\beta$", pp. 396-401.

*Primary Examiner*—John D. Lee
*Assistant Examiner*—Frank González
*Attorney, Agent, or Firm*—Sylvan Sherman; Gregory C. Ranieri

[57] ABSTRACT

A velocity match between a traveling optical wave and an interacting traveling electrical wave having a different velocity of propagation is simulated by shaping the electrical signal path so that interaction between the two waves occurs along selected regions of the electrical signal wavepath. In particular, the electrical wavepath bends away from the optical wavepath at uniformly spaced intervals to produce regions of no interaction along the electrical wavepath. This technique is employed to modulate optical waves via the electrooptic effect.

6 Claims, 5 Drawing Figures

TRAVELING WAVE, VELOCITY MISMATCHED GATE

TECHNICAL FIELD

This application relates to traveling wave, velocity mismatched gates.

BACKGROUND OF THE INVENTION

In U.S. Pat. No. 4,005,927 and 4,251,130 and 4,372,645, gating circuits of the velocity matched type (VMG) are disclosed. In the cited patents, gating is produced by a traveling electrical modulating signal that propagates in synchronism with an optical signal. These are the so-called "traveling wave, velocity matched gates" (TW-VMG). In U.S. Pat. No. 4,372,645, the electrical circuit is tuned so as to produce a standing electrical wave. However, the two oppositely propagating waves that produce the standing wave are also velocity matched to the optical signal. This class of device is the so-called "standing wave, velocity matched gate" (SW-VMG).

The general problem with both classes of traveling wave gates resides in the fact that the refractive indices of the substrate material in which the gate is formed are very different at the two frequencies of interest, i.e., the electrical signal and optical signal frequencies. As a consequence, the electrical wavepath must be specially designed in order to satisfy the velocity match requirement, and to the extent that the velocities of the two signals are not carefully matched, the switching efficiency degenerates significantly.

In an alternative approach, described in 4,380,364, no attempt is made to satisfy the velocity match requirement. Instead, a velocity match is simulated in a basically velocity mismatch gate structure by shaping the electrical signal wavepath so that interaction of the electrical signal wave with the optical signal wave occurs only along selected regions of the electrical signal wavepath. More specifically, whenever the phase of the electrical signal (i.e., the electric field direction) is such as to intereferc with the desired transfer of optical power between the coupled optical waveguides, the electrodes are physically displaced so that there is no longer any interaction between the electrical field and the optical signal.

The wavepath configuration disclosed in U.S. Pat. No. 4,372,643 was designed to match a standing wave modulating signal to a traveling wave optical signal. It is a problem with this device, however, that if the modulation signal losses are substantial, the locations of the nulls are displaced and vary as a function of time. As a consequence, the wave pattern is not uniform along the length of the device, thus complicating its design and fabrication. The design problem is further complicated if the ratio of the optical signal velocity and the modulating signal velocity is not an integer.

SUMMARY OF THE INVENTION

In accordance with the present invention velocity match is simulated between an optical wave and a traveling electrical wave by means of bends in the electrical signal path that are uniformly spaced along the interaction region. In particular, the electrical signal path bends away from the optical signal path at longitudinally spaced intervals that are a function of the modulating signal wavelength and the relative velocities of the modulating and optical signals. It is an advantage of the invention that the distance between bends is independent of the loss in the electrical signal wavepath, and the ratio of the signal velocities does not have to be an integer.

DETAILED DESCRIPTION

Figures 1, 2:
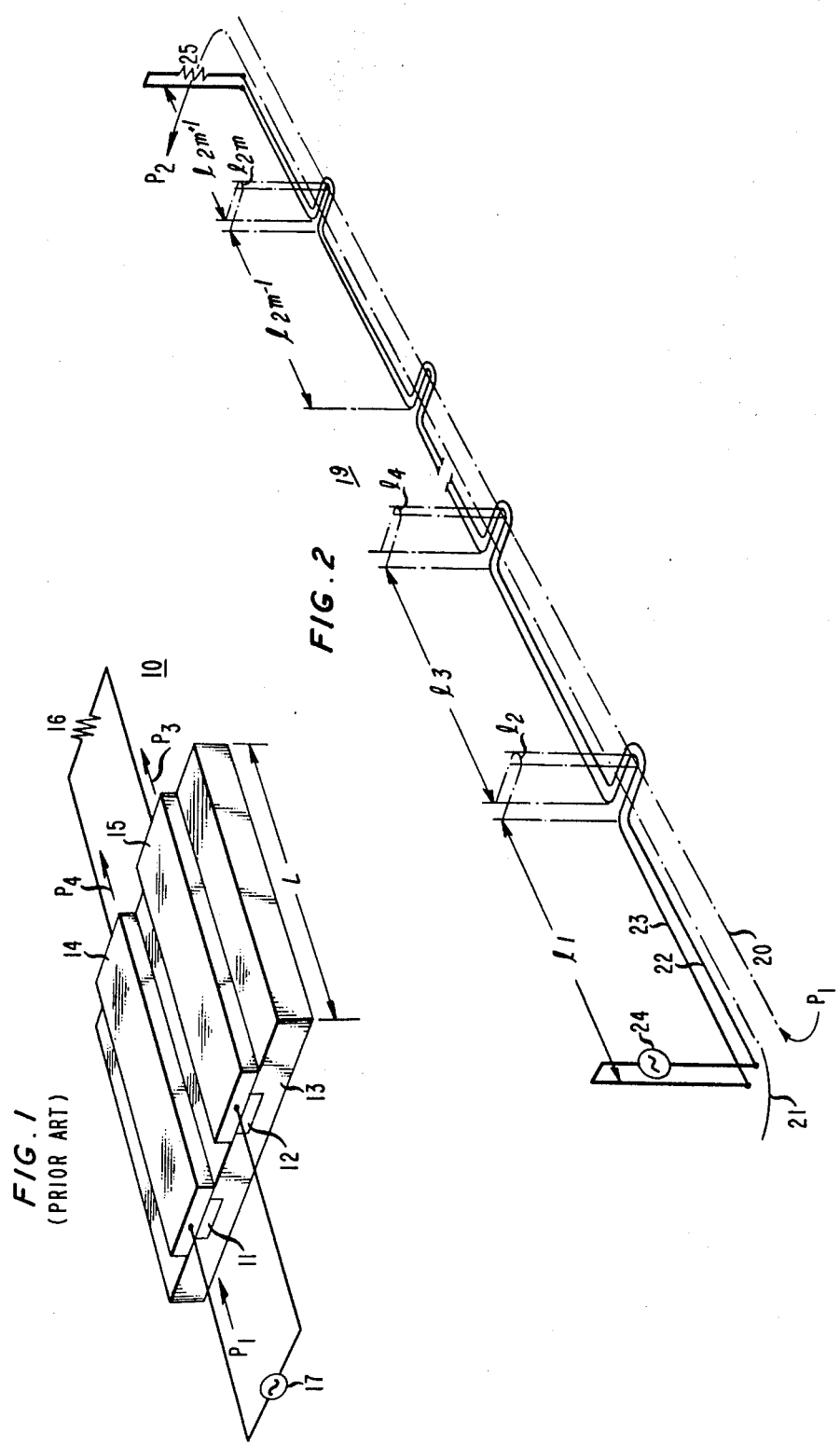
FIG. 1 shows a prior art traveling wave, velocity matched gate.
FIG. 2 shows a line sketch of a traveling wave, velocity mismatched gate in accordance with the invention.

The operation of both the velocity matched prior art gate and the instant, velocity mismatched gate is based upon controlling the transfer efficiency between a pair of coupled wavepaths. For purposes of explanation and illustration, reference will be made to electrical (i.e., rf) signals and optical signals, and electrical and optical wavepaths. However, it should be understood that the principles of the invention are equally applicable to any kind of interacting wavepaths including, for example, electron beams, solitons, phonons, etc. In addition, such interaction can occur at any frequency. With these facts in mind, reference is now made to FIG. 1 which shows a prior art TW-VMG of the type disclosed in the above-cited Marcatili U.S. Pat. No. 4,251,130. The gate comprises an optical directional coupler 10 including a pair of essentially identical dielectric waveguides 11 and 12 embedded in an electrooptic substrate 13 of lower refractive index. The guides are coupled over an interval L, where the coupling coefficient per unit length, k, and the coupling interval L are related by $$kL = \pi/2 \tag{1}$$

Modulating means for varying the transfer efficiency between the guides comprise a pair of electrodes 14 and 15 which, in the illustrated embodiment, are located directly over the optical waveguides 11 and 12, respectively. The electrodes form an electrical transmission line that is terminated at its output end by a resistor 16 whose magnitude is equal to the characteristic impedance of the line, and is energized at its input end by a signal source 17.

In the absence of a modulating electric signal from source 17, the propagation constants $\beta_1$ and $\beta_2$ of the two waveguides 11 and 12 are equal. As a result, an optical signal $P_1$, applied to one end of guide 11, is completely coupled to waveguide 12. If, however, an electric field is applied between the electrodes, the propagation constants $\beta_1$ and $\beta_2$ are locally perturbed due to the electrooptic effect. Thus, at any point x along the coupler, the propagation constant varies as a function of time t. Assuming a sinusoidal electrical signal of period T, the difference in phase constants $\Delta\beta$ is given by $$\Delta\beta = \beta_1 - \beta_2 = \frac{4\pi\Delta n}{\lambda} \sin\left\{\frac{2\pi}{T}\left(\frac{x}{V} - t\right)\right\}; \quad (2)$$

where $\lambda$ is the free space wavelength of the optical signal;

V is the propagation velocity of the electrical signal; and $\Delta$n is the maximum index change introduced in each of the guides by the electrical field.

The perturbation represented by equation (2) propagates along the optical wavepaths along with the optical signal. In the velocity matched coupler, the perturbation and the optical signal propagate at the same velocity. Hence, light entering the system at any particular instant sees the same propagation constant difference throughout. In particular, light entering at a time when the modulating voltage is zero sees a $\Delta\beta$ which is and remains zero, resulting in a complete transfer of energy between wavepaths. At all other instants, $\Delta\beta$ has some finite value such that there is less than complete tranfer of the incident light.

If the electrical and optical waves are not synchronized, photons entering the coupler see a constantly changing $\Delta\beta$ as they propagate therealong. However, by the appropriate design of the coupler, this effect can be utilized to produce an alternating $\Delta\beta$ coupler of the type described in an article by H. Kogelnik and R. V. Schmidt entitled "Switched Directional Couplers with Alternating $\Delta\beta$", published in the July 1976 issue of the *IEEE Journal* of *Quantum Electronics*, Vol. QE-12, No. 7, pages 396-401. This effect is employed by Marcatili in a standing-wave, velocity mismatched gate, as explained in his above-identified application. To preclude coupling, conditions must be established in which the coupling efficiency is reduced as a function of time, as represented by changes in the phase of the modulating signal.

The present invention provides a means for controlling the transfer of signal power between coupled waveguides in a traveling way, velocity mismatch device by shaping the electrical signal wavepath so that interaction between the electrical and optical circuits occurs along selected intervals of the electrical circuit. More specifically, whenever the electric field impressed across the optical wavepath is in the wrong direction for the desired sense of interaction, the electrical signal wavepath is shaped so as to preclude such interaction over that particular interval, as illustrated in FIG. 2, which shows a line sketch of a traveling wave, velocity mismatched gate in accordance with the present invention. The coupled waveguides are represented by broken lines 20 and 21. These can be optical waveguides of the type described in connection with FIG. 1. The traveling wave, electrical signal wavepath 19 is represented by the solid lines 22 and 23. These, typically, are metallic electrodes. A modulating signal source 24 is connected at the input end of the electrical signal path, and a terminating resistor 25, equal to the characteristic impedance of the path, is connected at the other end. As indicated hereinabove, the electrical signal path includes both regions which bend away from the optical waveguides so as to preclude any interaction, and regions which are aligned with the optical wavepath so as to produce the desired interaction. The former are represented by bends $l_2, l_4 \ldots l_{2m}$, and the latter by the intervals $l_1, l_3, \ldots l_{2m+1}$.

As explained hereinabove, in the absence of a modulating signal from signal source 24, the propagation constants $\beta_1$ and $\beta_2$ of the optical waveguides 20 and 21, respectively, are equal and constant over the entire coupling interval L. Accordingly, an optical signal $P_1$, applied at one end of waveguide 20, is completely transferred to the second waveguide 21, and exits as signal $P_2$ at the other end thereof, where $P_2 = P_1$. If, however, the electrodes are energized, the resulting electric field propagating along the electrodes locally perturbs the propagation constants $\beta_1$ and $\beta_2$ due to the electrooptic effect. Thus, at every point along the coupler, the propagation constants of the two optical waveguides vary as a function of time. More specifically, because the electric fields in the two waveguides are oppositely directed, the two propagation constants are affected differently. Typically, one is increased while the other is decreased relative to their zero field values. Consequently, the net power transfer between the two waveguides, which varies as a function of the phase constants difference, $\Delta\beta = \Delta_1 - \Delta_2$, is modulated by the electric signal.

In the velocity matched gate, the $\Delta\beta$ seen by photons entering the input waveguide remains constant over the entire coupling interval inasmuch as the optical wave and the modulating wave propagate in synchronism. In the case of a velocity mismatch, the two waves do not propagate in synchronism, producing what is referred to as a "walkoff" effect. In the instant case, where the optical wave propagates at a faster rate than the electrical signal, photons entering at any instant tend to "catch up" with the electrical wave. As a result, in the absence of any compensating arrangements, the electric field variations, and the resulting $\Delta\beta$ seen by the photons as a function of distance along the coupler, vary in a manner illustrated by the curves in FIG. 3. The particular $\Delta\beta$ variation depicted by curve 30 is for photons entering at the instant the modulating signal is at zero amplitude, as represented by curve 40 in FIG. 4. Because the optical signal propagates more rapidly than the electrical signal, these photons catch up with portions of the previously applied modulating signal depicted by the $-t$ portion of curve 40. In particular, in an interval $2l_o$ the photons see a complete modulating voltage cycle, and the corresponding $\Delta\beta$ variations, where $l_o$ is given by $$l_o = \frac{\lambda_{rf}}{2n_{rf}}\left(1 - \frac{V_{rf}}{V_o}\right)^{-1} \quad (3)$$

for copropagating waves, where $\lambda_{rf}$ is a specified modulating signal wavelength in free space;

$n_{rf}$ and $V_{rf}$ are, respectively, the effective refractive index and velocity of propagation at the specified wavelength;

and $V_o$ is the velocity of propagation of the optical signal.

For counter-propagating waves, the minus sign in equation (3) is replaced by a plus sign.

Figure 3:
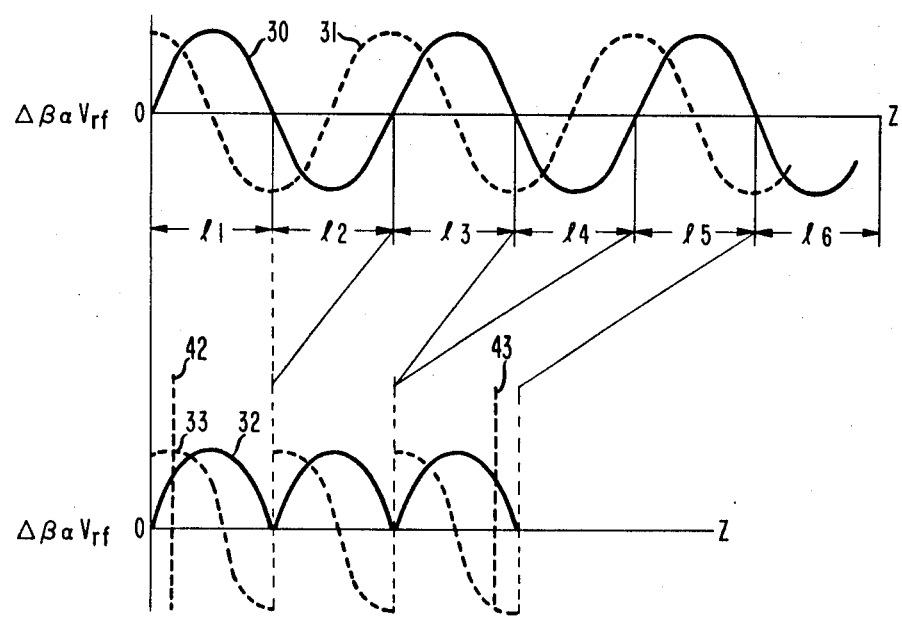
FIG. 3 shows the variations in $\Delta\beta$ as a function of distance along the optical wavepath as seen by photons entering the gate at two different phases of the modulating signal.
Figure 4:
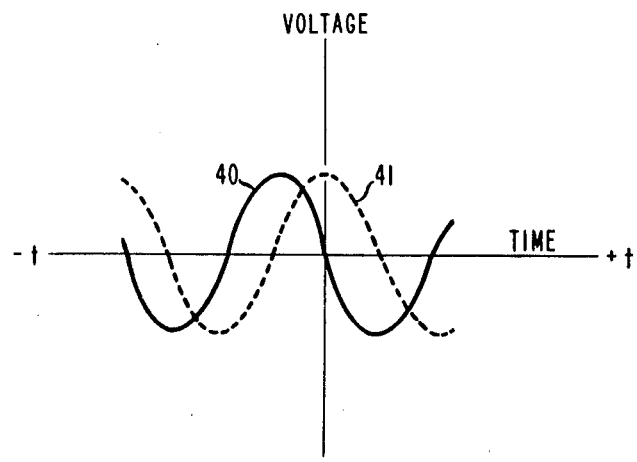
FIG. 4 shows variations in the modulating signal as a function of time.

A similar $\Delta\beta$ variation occurs for photons incident at other times during the modulating signal cycle, as indicated by curve 31 in FIG. 3, which corresponds to a 90 degree phase shift in the modulating signal, as represented by curve 41 in FIG. 4.

Both of the curves 30 and 31 in FIG. 3 illustrate the effect of walk-off on $\Delta\beta$. In each case and, indeed, for all cases, the effect of walk-off is to establish a reverse $\Delta\beta$ condition which minimizes throughput and maximizes coupling between the optical waveguides.

To minimize this effect and, thereby, to discriminate among optical signals entering the system at different times in the modulation signal cycle, interaction between the electrical and optical signals is restricted in certain regions. In particular, interaction only occurs along alternate intervals of the modulating signal path, as indicated in FIG. 2 where regions $l_2, l_4 \ldots l_{2m}$, each of length $\lambda_{rf}/2n_{rf}$, are bent away from the optical wavepaths, thus restricting interaction to regions $l_1, l_3, \ldots l_{2m+1}$ each of length $l_o$. The effect of this is illustrated in FIG. 3 wherein the $\Delta\beta$ curve is redrawn so as to include only the interacting regions $l_1, l_3$, and $l_5$. For curve 30, the modified $\Delta\beta$ is given by curve 32. For curve 31, the modified $\Delta\beta$ curve 33. What is immediately apparent is that photons entering when the modulating signal is zero no longer experience reversals in $\Delta\beta$ as they propagate along the coupling interval. Inasmuch as the throughput efficiency $\eta = P_2/P_1$ is a function of the integral of $\Delta\beta$ over the coupling interval, it is evident that curve 32, for which the integral is a maximum, represents a condition of maximum throughput and minimum coupling.

Photons entering when the magnitude of the modulating signal is a maximum, on the other hand, continue to experience a reverse $\Delta\beta$ condition, and efficient coupling can be effected. The net result is to simulate velocity matched operation.

Figure 5:
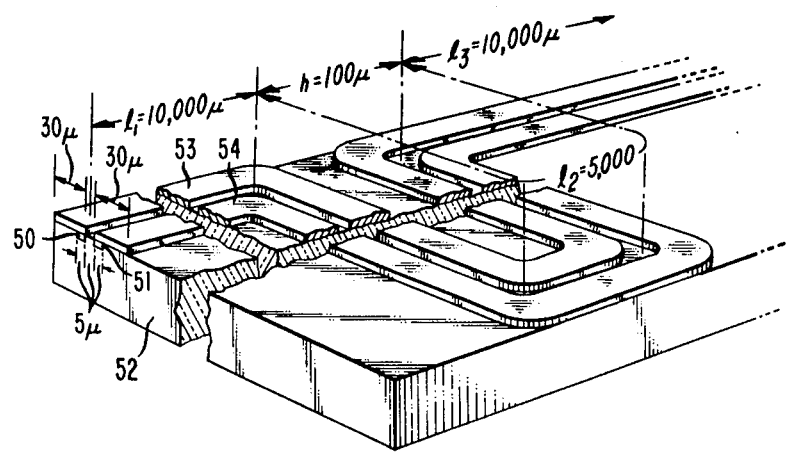
FIG. 5 shows one arrangement of electrodes for producing the $\Delta\beta$ pattern shown in FIG. 3.

One arrangement of the electrodes for effecting this simulation is illustrated in FIG. 5, which shows a portion of a gate comprising a pair of coupled, optical waveguiding regions 50 and 51 embedded in a substrate 52 of lower refractive index. Superimposed upon the respective optical wavepaths are a pair of electrodes 53 and 54. Instead of extending coextensively over the optical wavepaths, the electrodes illustrated in FIG. 5 are provided with intervals which extend away from and do not interact with the optical wavepaths. One such noninteracting interval $l_2$, is shown in FIG. 5 located between a pair of interacting regions, $l_1$ and $l_3$.

Also illustrated in FIG. 5 are some typical dimensions. For example, optical wavepaths 50 and 51 are indicated as being $5\mu$ wide, and separated by $5\mu$. Electrodes 53 and 54 are $30\mu$ wide. By comparison, the interacting lengths and the noninteracting interval are of the order of $10,000\mu$ and $5000\mu$, respectively. The resulting gap, h, produced along the optical wavepath by the bent interval $l_2$ is of the order of $100\mu$. This length, being relatively small compared to the length of the interacting regions results in a minimum perturbation in the operation of the gate. It will be further noted that by keeping the distance between the electrodes constant over their entire lengths, perturbation within the electrical wavepath is also minimized.

In the discussion above, it was assumed, for purposes of discussion, that all of the intervals were of equal length $l_o$. It was indicated, however, that the first interval and the last may be equal to or less than $l_o$. If, for example, the first interval is less than $l_o$, the effect is the equivalent of a phase shift in the modulation signal, as indicated in FIG. 3 by the shifted vertical axis 42. Similarly, if the last interval is less than $l_o$, the effect is to end the interaction interval at a point indicated by axis 43. In both cases, the performance is slightly degraded. However, in all other respects the devices will operate as described hereinabove.

While not specifically illustrated, it is readily apparent that a traveling wave gate, in accordance with the present invention, can be employed in lieu of the traveling wave gates used in the pulse generator disclosed in the above-cited Marcatili U.S. Pat. No. 4,251,130. The same electrode structure can also be used in other electrooptic modulators to overcome any bandwidth limitation caused by the velocity mismatch.

What is claimed is:

1. In combination
first waveguiding means for optical signals;
second waveguiding means for electrical signals, supportive of a traveling wave, disposed adjacent to and interacting with said first waveguiding means,
said second waveguiding means including portions, at equally spaced intervals, which bend away from said first waveguiding means to produce regions of no interaction along said second waveguiding means.

2. The combination according to claim 1 wherein:
said first waveguiding means comprises a pair of coupled optical waveguides;
said second waveguiding means comprises a plurality of electrodes forming a planar strip transmission line.

3. The combination according to claim 2 wherein:
said optical waveguides comprise a pair of strips embedded in an electrooptical material of lower refractive index;
and wherein said interaction occurs via the electrooptic effect.

4. The combination according to claim 1 wherein:
said first and second waveguiding means form an optical device
and wherein a signal propagating along said second waveguiding means locally modulates the operative parameter of said device.

5. The combination according to claim 4 wherein:
said device is a modulator;
said first waveguiding means is a pair of coupled optical waveguides;
and said operative parameter is the difference $(\Delta\beta)$ in the phase constants of said optical waveguides.

6. The combination according to claim 1 wherein the length of said intervals, $l_o$, is given by $$l_o = \frac{\lambda_{rf}}{2n_{rf}(1 - V_{rf}/V_o)},$$

and the length of said noninteracting regions is given by $\lambda_{rf}/2n_{rf}$, where $\lambda_{rf}$ is the wavelength of a specified electrical signal in free space; $n_{rf}$ and $V_{rf}$ are, respectively, the effective refractive index of said second waveguiding means at said wavelength, and the velocity of propagation of said specified signal; and $V_o$ is the velocity at which a specified optical signal propagates along said first waveguiding means.

* * * * *